Nov. 24, 1953
J. BOYCE ET AL
2,660,012
MACHINE FOR CLOSING CARTONS
Filed Dec. 6, 1950
10 Sheets-Sheet 1
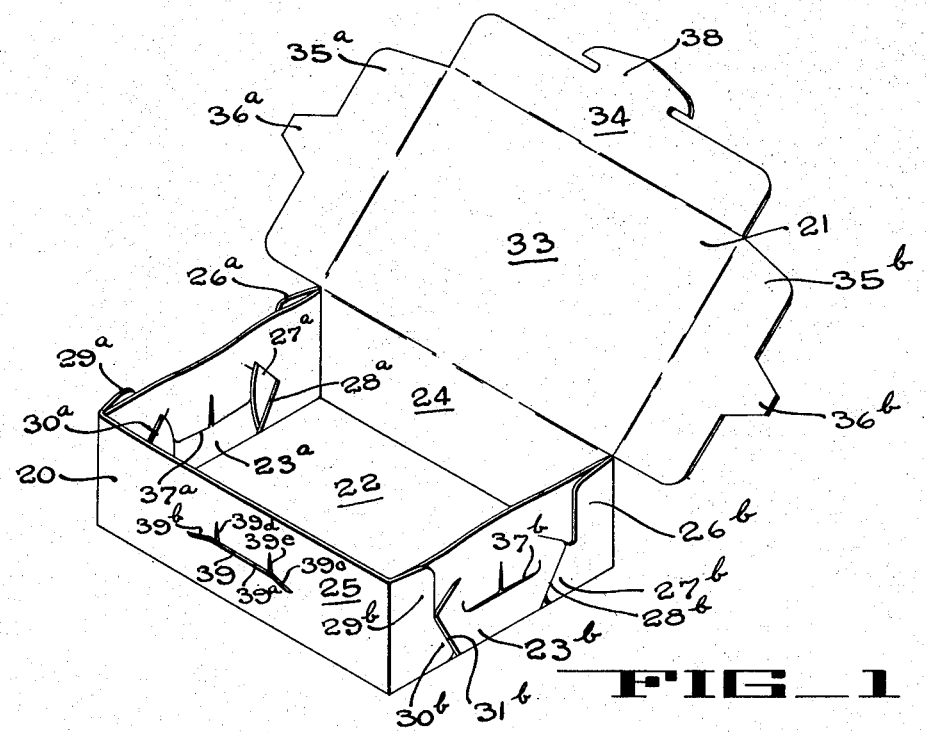
FIG_1
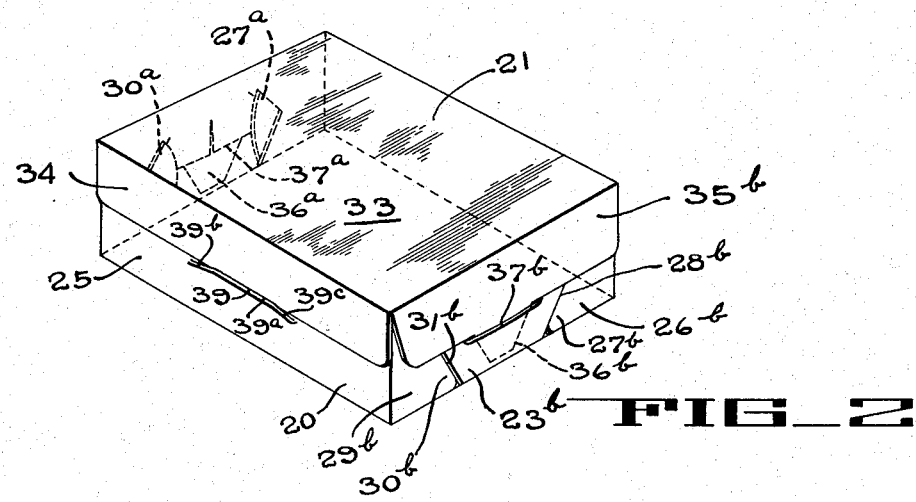
FIG_2
Inventors
JOHN BOYCE
DUDLEY W. HAYES
By Hans G. Hoffmeister.
Attorney

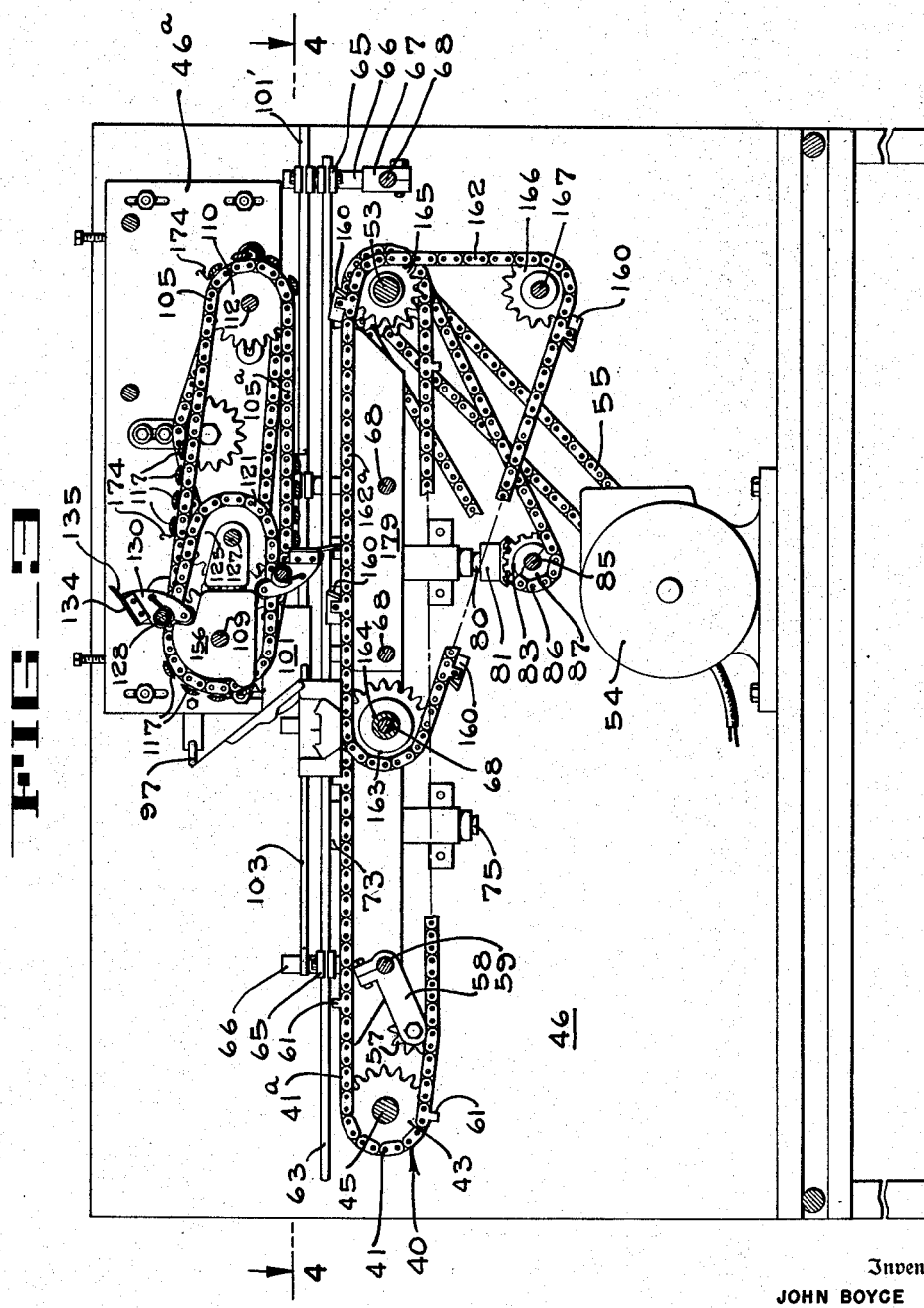

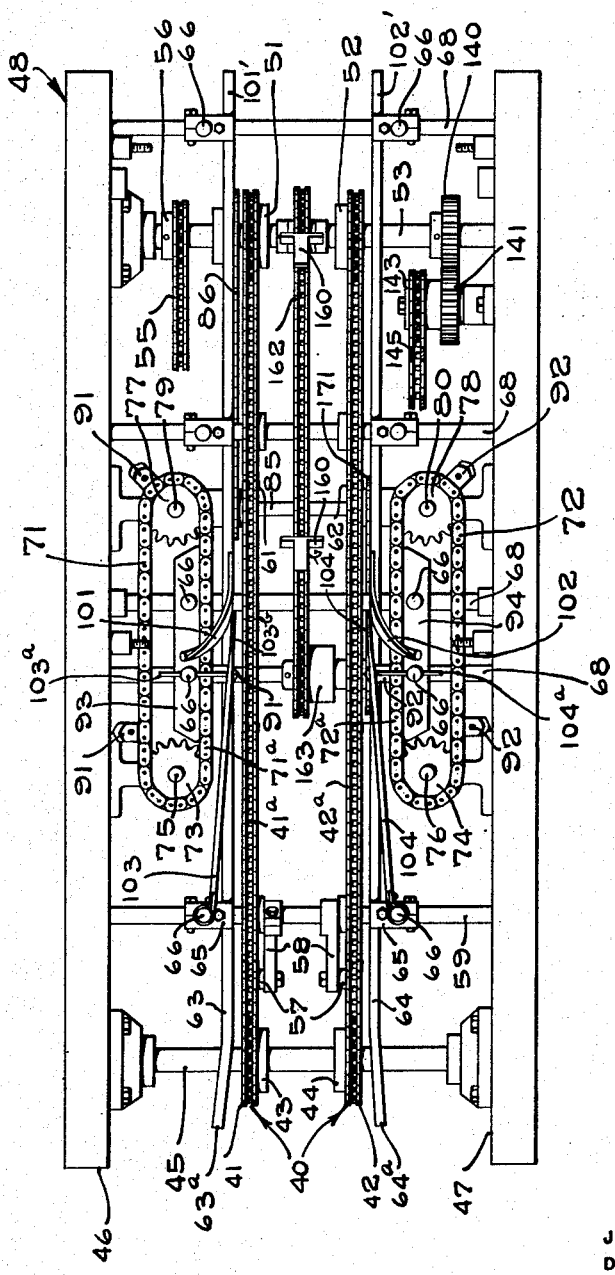

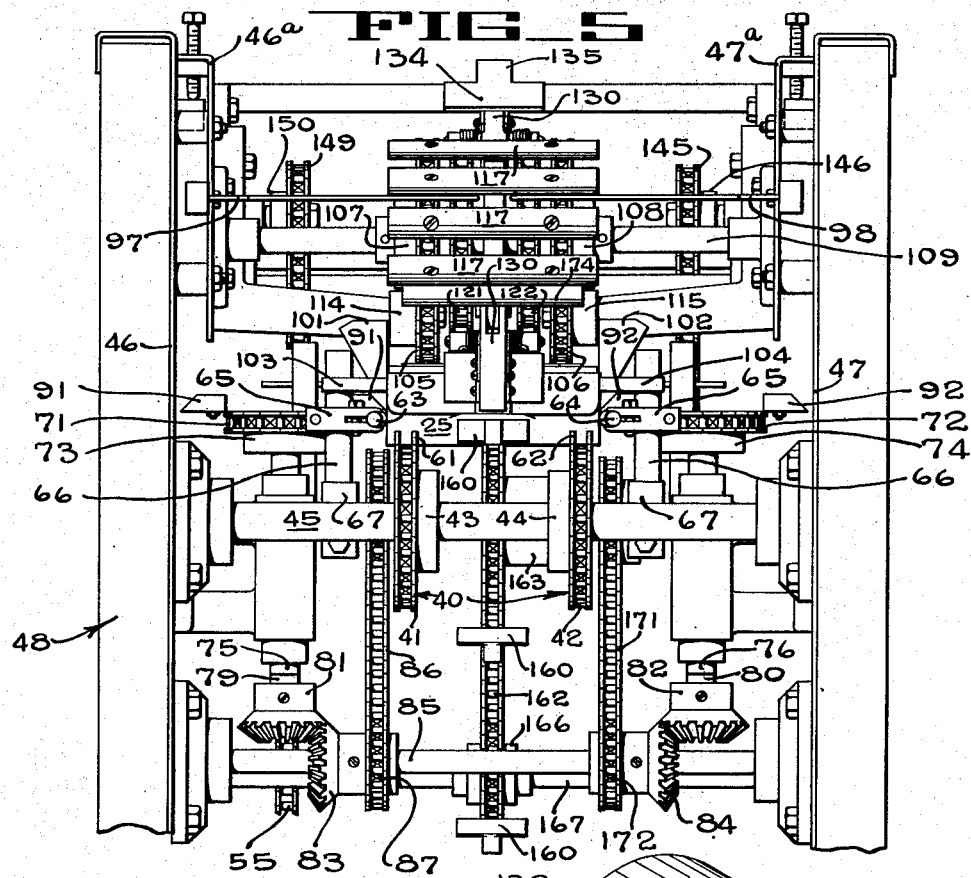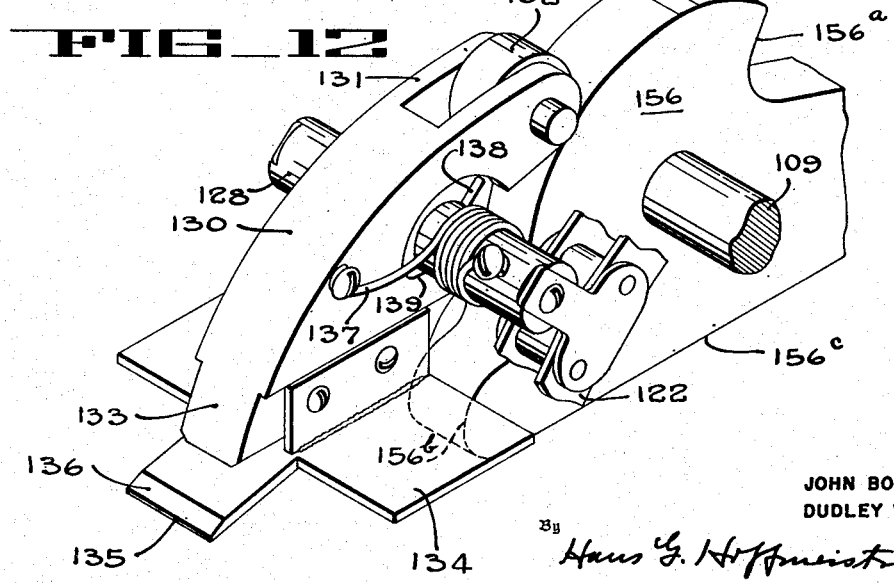

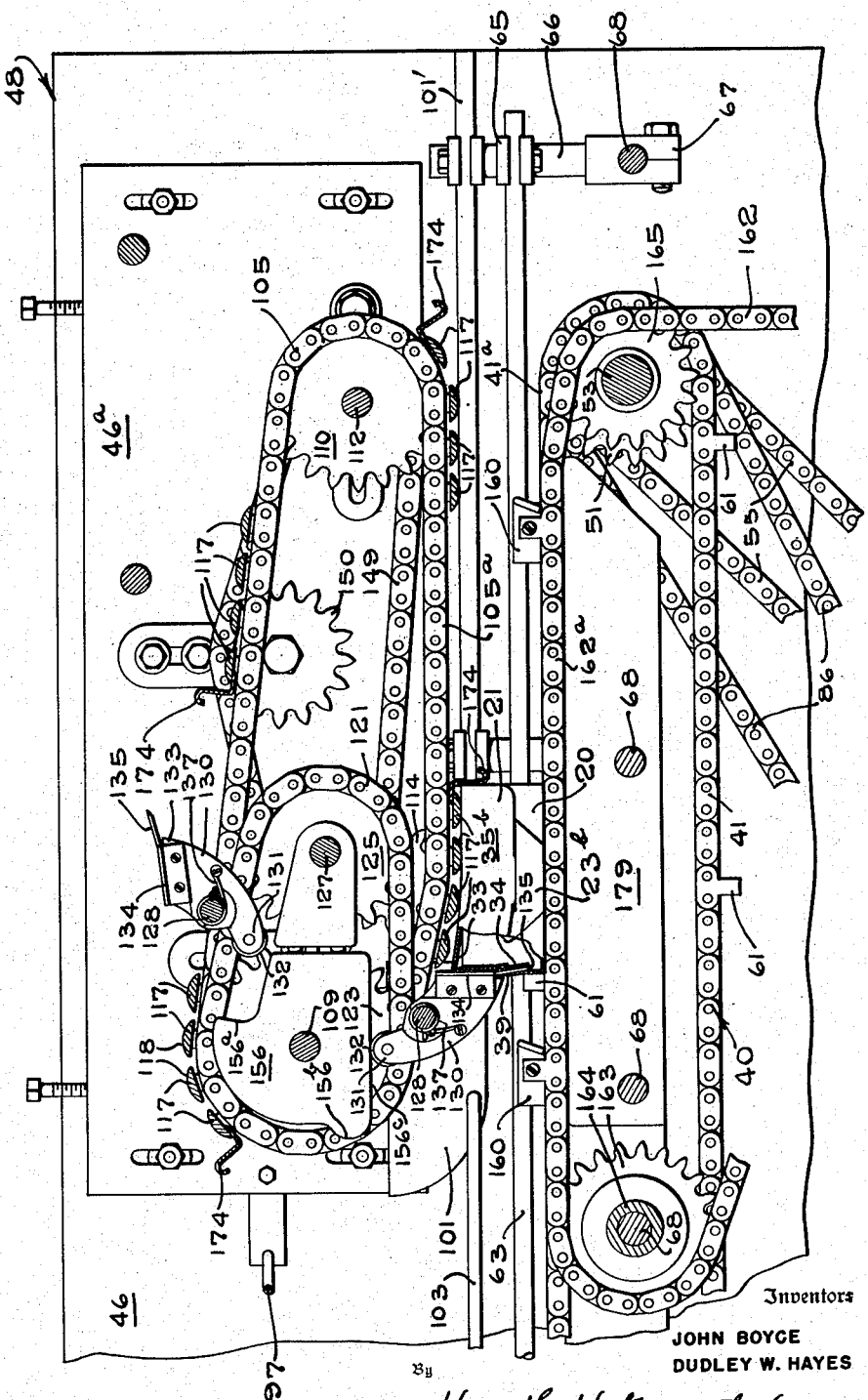

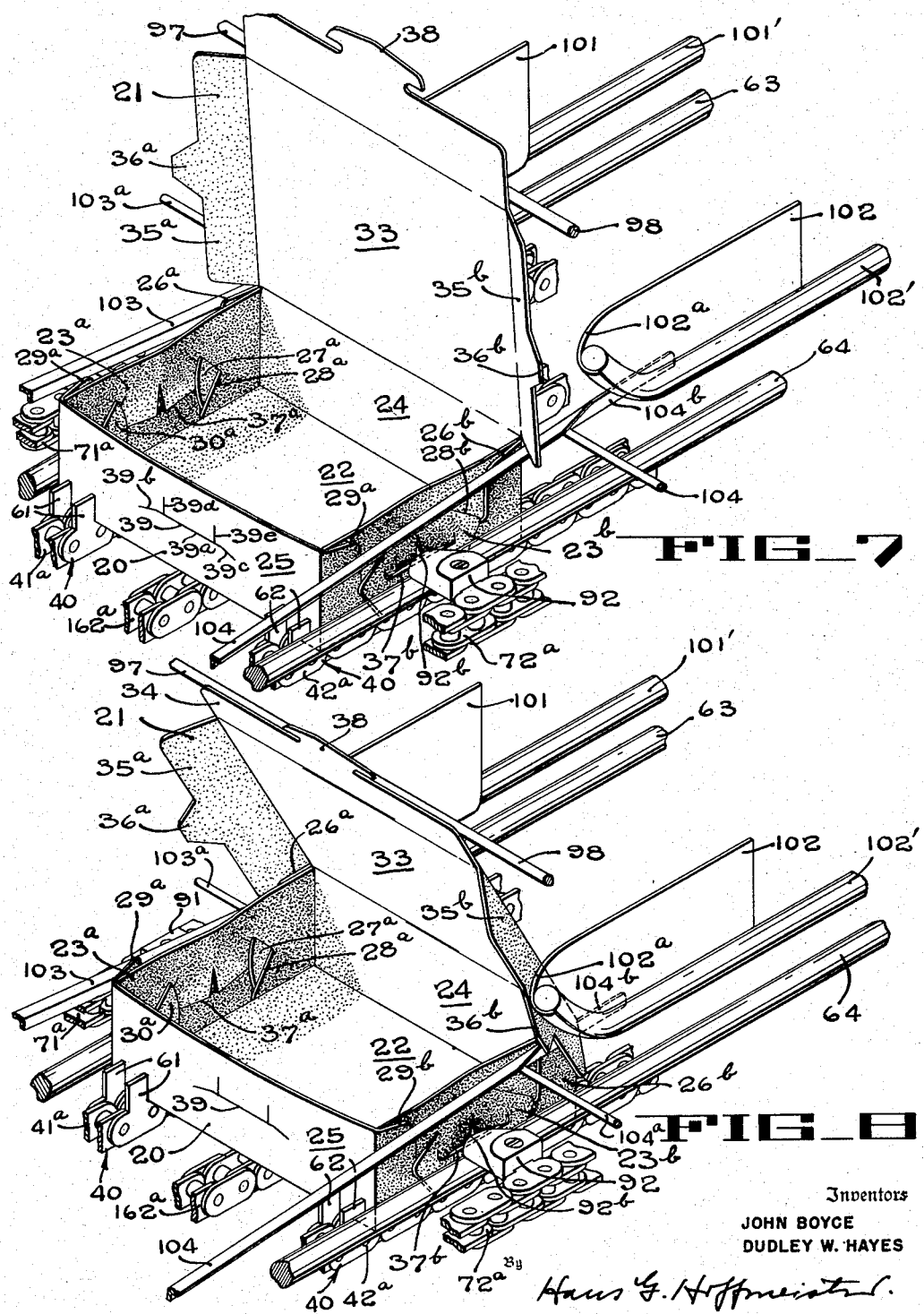

Nov. 24, 1953 J. BOYCE ET AL 2,660,012
MACHINE FOR CLOSING CARTONS
Filed Dec. 6, 1950 10 Sheets-Sheet 7
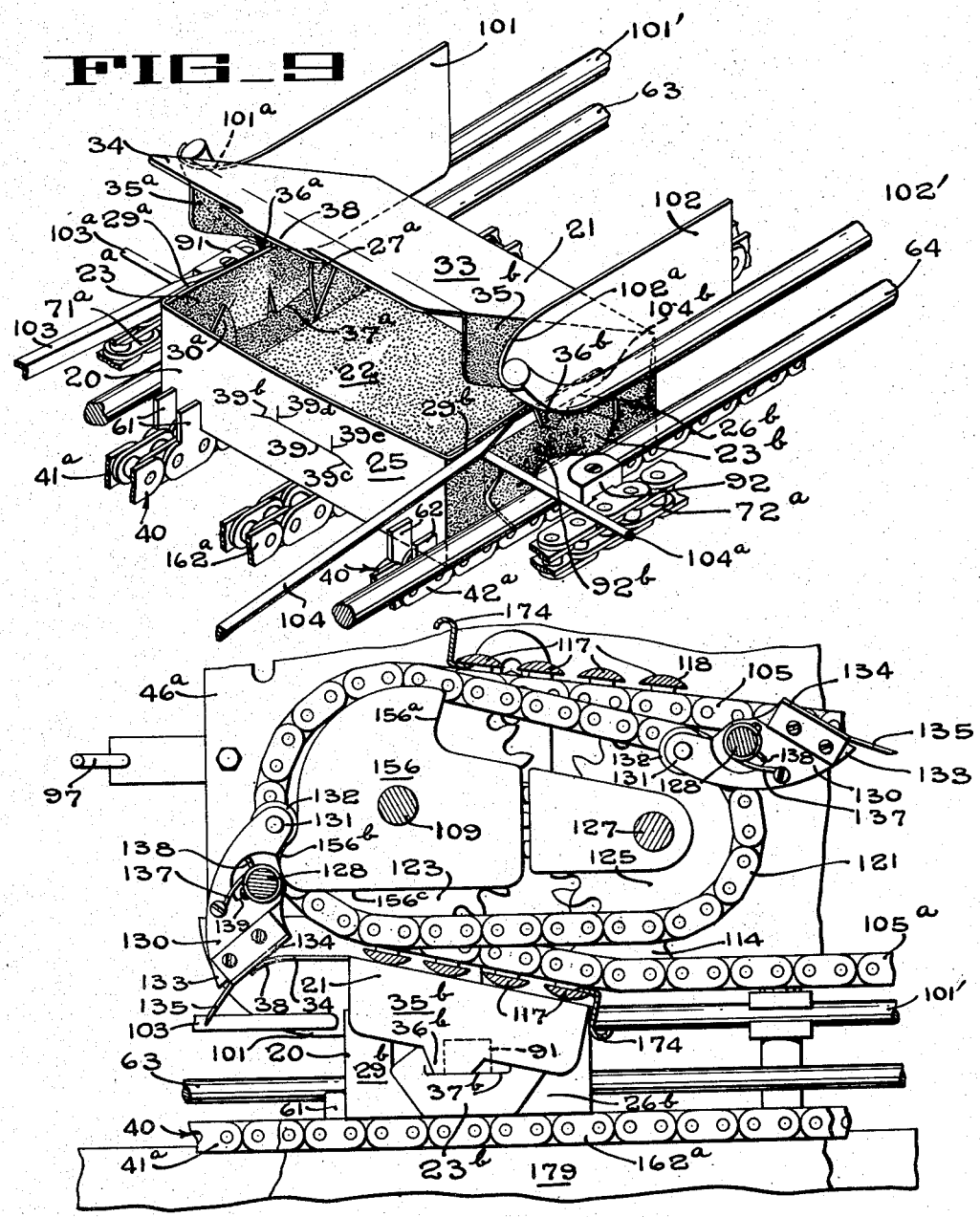
Inventors
JOHN BOYCE
DUDLEY W. HAYES
By Hans G. Hoffmeister
Attorney

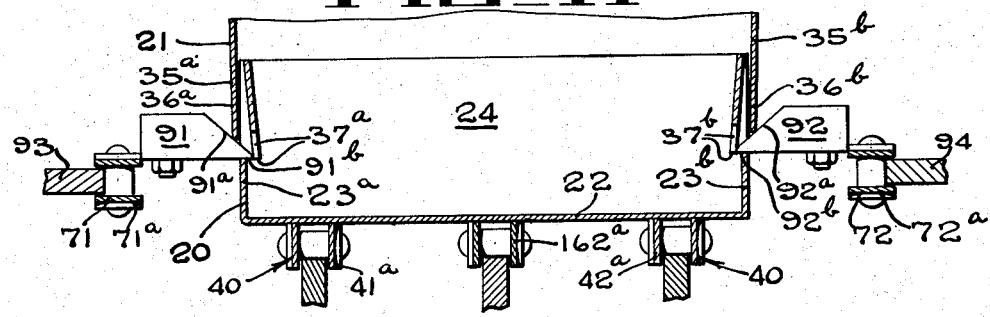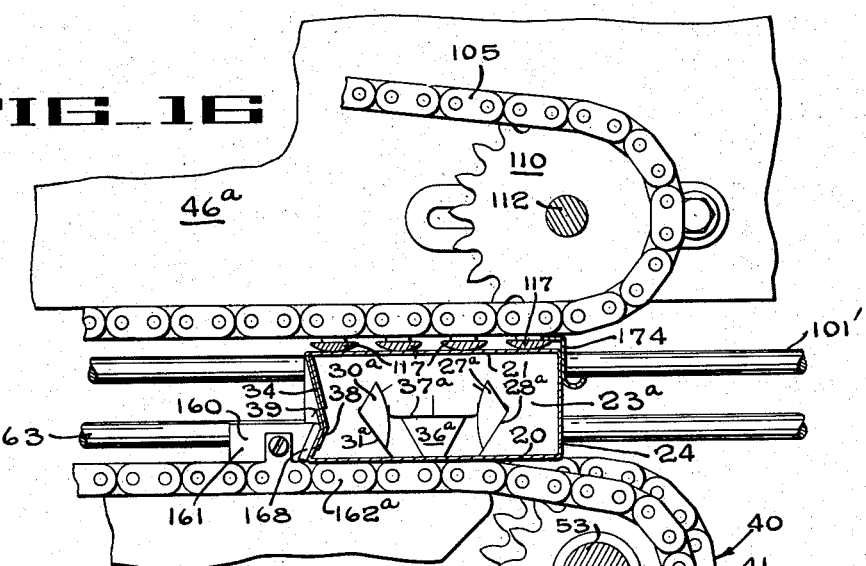

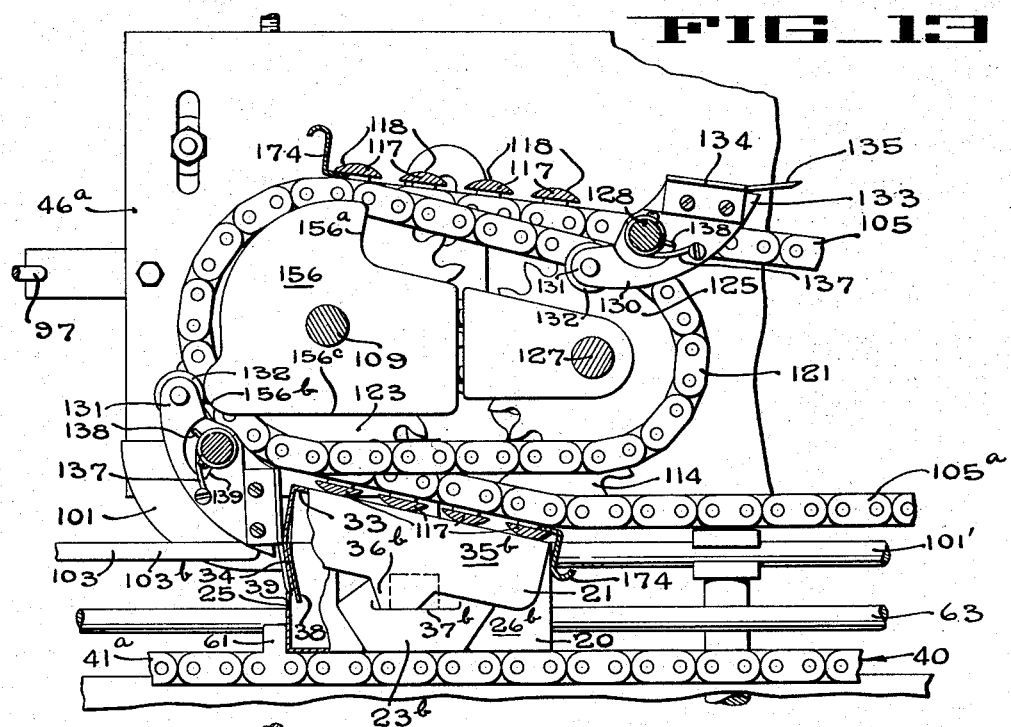
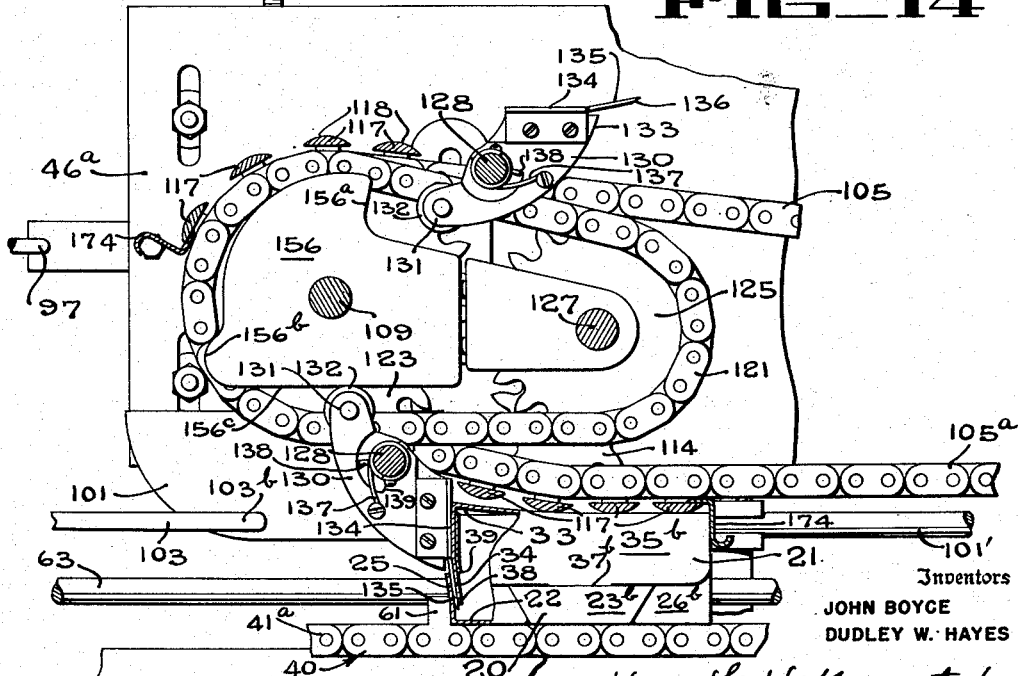

Nov. 24, 1953    J. BOYCE ET AL    2,660,012
MACHINE FOR CLOSING CARTONS
Filed Dec. 6, 1950    10 Sheets-Sheet 10
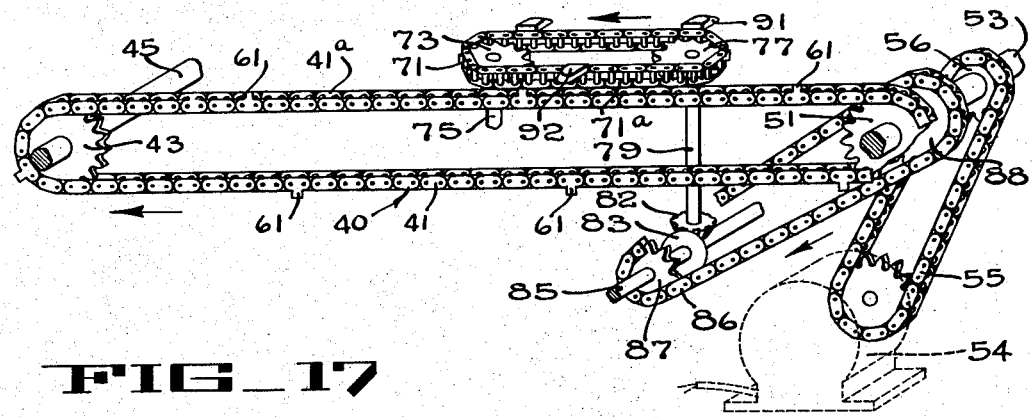
FIG_17
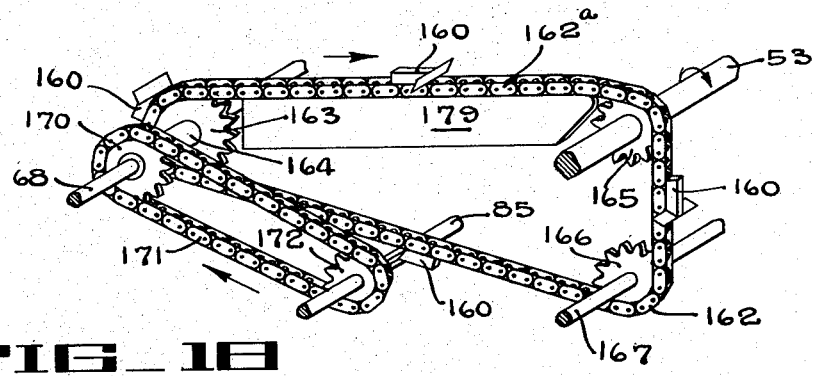
FIG_18
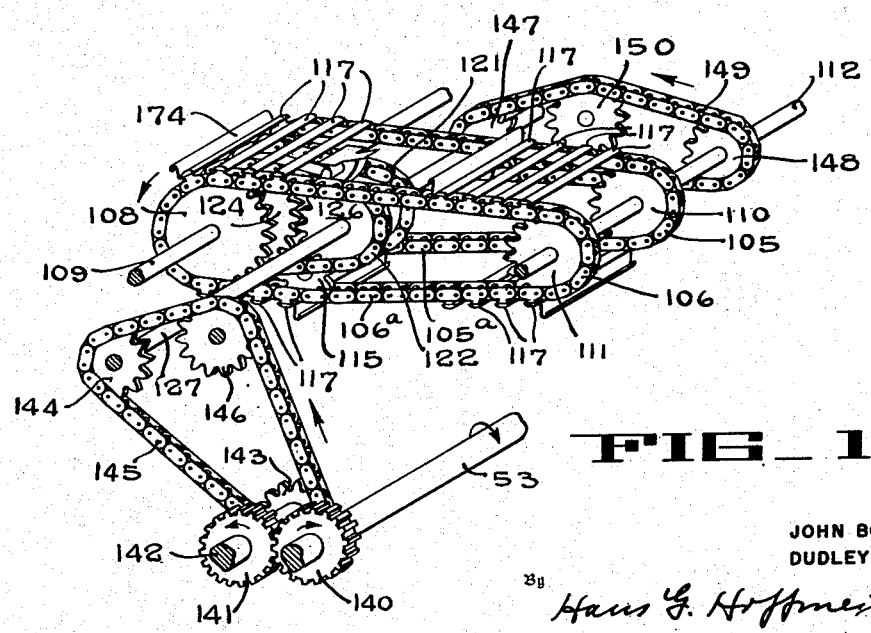
FIG_19
Inventors
JOHN BOYCE
DUDLEY W. HAYES
By Hans G. Hoffmeister
Attorney Patented Nov. 24, 1953

2,660,012

UNITED STATES PATENT OFFICE 2,660,012

MACHINE FOR CLOSING CARTONS

John Boyce, San Jose, and Dudley W. Hayes, Campbell, Calif., assignors to Food Machinery and Chemical Corporation, San Jose, Calif., a corporation of Delaware Application December 6, 1950, Serial No. 199,506

32 Claims. (Cl. 53—147)

The present invention relates to machines for closing cartons. More particularly the present invention relates to a machine for closing cartons of the type composed of a carton body and a lid or cover portion that is hingedly connected to one wall of said carton body. In cartons of this type the lid or cover portion is usually composed of a top panel which has one front and two end flaps hinged to the free sides of said top panel and provided with tabs which are adapted, upon closing of the cover, to slide into and interlock within slots or incisions provided in the corresponding walls of the carton body. Cartons of this type are widely used in the frozen food industries to pack fruit, vegetables, fish, meat, ice cream and the like.

It is an object of this invention to provide a machine for closing cartons of the type referred to that is adapted to process such cartons in a continuous procession at a rapid rate of production.

Another object is to provide a machine, of the type referred to, that is dependable in operation in that the danger of crushing, tearing or otherwise damaging the carton is practically eliminated.

Still another object is to provide a machine, of the type referred to, wherein the cartons are advanced without change of speed so that there is no danger that their contents may be spilled.

An additional object is to provide a machine for closing the covers of cartons, of the type referred to, in such a manner that the covers remain dependably in closed position after the carton has passed through the machine.

These and other objects of the invention will be apparent from the following description of the accompanying drawings which illustrate a preferred embodiment thereof and wherein:

Fig. 1 is a perspective of a carton of the type which the machine of the present invention is adapted to close, shown with its cover in open position;

Fig. 2 is a perspective similar to Fig. 1 of the same carton with its cover closed;

Fig. 3 is a vertical longitudinal section through a carton closing machine embodying the present invention;

Fig. 4 is a plan view of a horizontal section through the machine illustrated in Fig. 3 taken along line 4—4 thereof;

Fig. 5 is a front elevation of the same machine;

Fig. 6 is a vertical longitudinal section through the machine, similar to Fig. 3, illustrating the upper half thereof on a larger scale;

Fig. 7 is a perspective of a carton with its cover open as it moves into the initial sector of the carton closing channel formed by the machine illustrated in Figs. 3 to 6;

Figs. 8 and 9 are perspectives similar to Fig. 7 illustrating two consecutive positions of the carton in the carton closing channel of the machine.

Fig. 10 is a fragmentary view of a vertical longitudinal section through the machine, similar to Fig. 6, illustrating a still further advanced position of a carton processed in the machine of the invention;

Fig. 11 is a transverse section through a carton illustrating the manner in which the end tabs of its cover are inserted into the incisions provided in the end walls of the carton;

Fig. 12 is a perspective of the member that tucks the front tab of the carton cover into the slot or incision provided in the front wall of the carton body;

Figs. 13 and 14 are fragmentary views of a vertical longitudinal section through the front end of the machine, similar to Fig. 10, illustrating consecutive stages in the operation of the member illustrated in Figure 12;

Fig. 15 is a fragmentary perspective of a closed carton illustrating the operation of means that lock the front tab of the cover in the front wall of the carton body;

Fig. 16 is a fragmentary view of a vertical longitudinal section through the rear end of the machine with a closed carton about ready to be discharged from the machine; and Figs. 17, 18, and 19 are fragmentary perspectives illustrating the manner in which the various moving components of the machine are driven from a common source of rotary power.

The exemplary carton illustrated in Fig. 1 is of the type erected from a single blank of paper board material and comprises a body portion 20 and a lid or cover portion 21. The body portion is formed by a rectangular bottom panel 22 from which rise two end walls 23a and 23b, a rear wall 24 and a front wall 25. Said rear wall 24 has lateral flaps or flanges 26a and 26b that are folded over the adjacent edges of the end walls 23a and 23b and which are provided with tabs 27a and 27b, respectively, that are engaged within angular slots or incisions 28a and 28b provided in the end walls of the carton body. Similarly the front wall 25 of the carton body has lateral flaps or flanges 29a and 29b that fold over the adjacent edges of the end walls 23a and 23b, respectively, and which are provided with tabs 30a and 30b that are engaged within angular slots or incisions 31a and 31b provided in said ends walls. Hingedly connected to the rear wall 24 of the carton body 20 is the top panel 33 of the cover portion 21 and said top panel possesses a front flap 34 and a pair of end flaps 35a and 35b, respectively. Each of said end flaps is provided with a tab 36a and 36b, respectively, that is adapted to enter into and interlock within slits or incisions 37a and 37b in the form of an inverted T that are provided in the end walls 23a and 23b of the carton body. The front flap 34 of the cover 21 is likewise provided with a tab 38 that is adapted to enter into a composite incision 39 provided in the front wall 25 of the carton body and which is comprised of a substantially horizontal portion 39a the opposite ends of which are somewhat declined as shown at 39b and 39c and from which rise at horizontally spaced points two short vertical slits 39d and 39e.

Referring now to Figs. 3, 4 and 5 the carton closing machine of the invention comprises a conveyor 40 that is arranged to carry the cartons past the actual carton closing implements comprised in the machine. Said conveyor is formed by a pair of transversely spaced endless sprocket chains 41 and 42 which form upper horizontal runs 41a and 42b as best shown in Fig. 3. At the front end of the machine said chains are trained over a pair of sprockets 43 and 44 that are mounted upon an idler shaft 45 which is suitably supported from the side walls 46 and 47 of the machine frame 48 (Fig. 5), and at the rear end of the machine said chains 41 and 42 are trained over a pair of sprockets 51 and 52 that are firmly mounted upon a transverse drive shaft 53 which is also journaled in the before mentioned side walls 46 and 47 of the machine frame (Fig. 4). During operation of the machine the shaft 53 is constantly driven from a suitable source of rotary power, such as the electric motor 54 by means of a sprocket chain 55 that is trained around a sprocket 56 which is keyed to the shaft 53 as shown in Figs. 3, 4 and 17. To maintain the conveyor chains 41 and 42 in properly tensioned position, each of said chains may be associated with an idler sprocket 57 as shown in Fig. 3. Each of said sprockets 57 is pivoted to the free end of an arm 58 that is clamped to a transverse rod 59 which extends between and is firmly held in the previously mentioned side walls 46 and 47 of the machine frame. By proper choice of the angular positions of said arms 58 upon the rod 59, the sprockets 57 may be arranged to press from within against the lower runs of the endless chains 41 or 42, and thus keep said chains in properly tensioned condition.

At equal intervals along their circumference the conveyor chains 41 and 42 are provided with transversely aligned impeller lugs 61 and 62. The filled cartons are deposited upon the conveyor 40 with their rear walls 24 in leading position as shown in Fig. 7 so that the lugs 61 and 62 engage their front walls 25 and in this manner propel the cartons through and past the various cover closing implements comprised in the machine. To maintain the cartons in properly centered position during their advance through and past the carton closing implements longitudinally extending guide rods 63 and 64 are arranged at either side of the conveyor as best shown in Fig. 4. The front ends of said guide rods are flared outwardly, as shown at 63a and 64a, and to permit adjustment of said guide rods in horizontal as well as vertical direction for the purpose of adjusting the resultant guide channel to cartons of different width and height, each of said rods 63 and 64 may be held by a number of clamps 65 that are adjustably secured to short vertical posts 66 arranged at either side of the conveyor (Fig. 5). Said posts 66 rise from blocks 67 that are adjustably secured to the previously mentioned transverse rod 59 and another transverse rod 68 at the rear end of the machine, as shown in Figs. 3 and 4.

Arranged at either side of the conveyor 40 at the level of the guide rods 63 and 64 are two endless sprocket chains 71 and 72 that operate within a horizontal plane with their inner runs 71a and 72a extending parallel to said guide rods and to the upper runs 41a, 42a of the conveyor chains 41 and 42, respectively. The front ends of said horizontally positioned sprocket chains are trained around idler sprockets 73 and 74 that are firmly mounted upon the upper ends of vertical shafts 75 and 76 which are rotatably supported from the machine frame 48 a distance inwardly from the feed end of the conveyor as shown in Figs. 3 and 4. The rear ends of said sprocket chains 71 and 72 are trained about sprockets 77 and 78 that are mounted upon vertical shafts 79 and 80 which are likewise rotatably supported from the machine frame 48. Keyed to the lower ends of said shafts 79 and 80 are bevel gears 81 and 82 that mesh with bevel gears 83 and 84, respectively, which are firmly mounted upon a transverse shaft 85 that is suitably journaled in the machine frame (Figs. 3, 5 and 17). Said shaft 85 is constantly driven from the aforementioned drive shaft 53 of the conveyor 40 by means of a sprocket chain 86 that is trained around sprocket 87 keyed to said shaft 85 and a sprocket 88 keyed to the conveyor drive shaft 53. By the described train of sprockets and sprocket chains the two horizontal chains 71 and 72 are driven in such a manner that their inner runs 71a and 72a advance in the same direction and at the same speed as the upper runs of the conveyor chains 41 and 42. At equal intervals along their circumference said horizontal sprocket chains 71 and 72 carry beveled lugs 91, 92 that extend radially beyond their periphery at a level directly above the guide rods 63 and 64 (Figure 5) and the operation of said horizontal chains 71 and 72 relative to the conveyor chains 41 and 42 is timed in such a manner that when a pair of impeller lugs 61, 62 reaches a point in transverse alignment with the front ends of said horizontal chains 71, 72, a pair of beveled lugs 91 and 92 will be half a carton width in advance of the impeller lugs in the direction of the common movement of said chains. Hence, when said impeller lugs 61, 62 move a carton of the type described into the space between the horizontally disposed chains 71 and 72, the bevelled lugs 91, 92 engage the center areas of the end walls 23a and 23b of said carton and press them inwardly, thereby opening the incisions 37a and 37b in said end walls as shown in Fig. 7 so that they may receive the end flap tabs 36a and 36b of the carton cover 21. In order that the beveled lugs 91 and 92 may positively deform the end walls of the carton in the described manner, the inner runs 71a and 72a of the horizontal sprocket chains 71 and 72 are supported by guide plates 93 and 94 that are suitably supported from the machine frame (Figure 4).

The covers of cartons deposited on the conveyor 40 are frequently opened to such an extent that they form an angle of more than 90° with the top surface of the carton body such as illustrated in Fig. 1. As a first step in closing cartons, it is therefore necessary that such forwardly inclined carton covers be swung backwards until they form at least a right angle, and preferably an acute angle, with the top surface of the carton body, whereupon means are brought into operation that fold the end flaps 35 of each carton and press them down upon the end walls 23 of the carton body so that, upon further closing of the carton cover, the tabs 36 of said end flaps slide into the incisions 37 in said end walls as said incisions are held open by the beveled lugs 91, 92 in the manner hereinbefore described. For this purpose at a point a limited distance beyond the front end of the horizontally positioned conveyor chains 71, 72 two rods 97 and 98 are arranged to extend at a suitable altitude transversely across the path of the advancing cartons 41, 42 (Figs. 3 and 5), said rods may be supported from vertical panels 46a and 47a that are disposed adjacent to, and are adjustably supported from the side walls 46 and 47 of the machine frame. As a carton with its cover folded forwardly enters into the space between the horizontal conveyor chains, said rods 97, 98 engage the outer surface of said cover and, as the carton continues to advance, they fold said cover from the forwardly inclined position illustrated in Fig. 7 to the rearwardly inclined position illustrated in Figs. 8 and 9, wherein it forms an acute angle with the top surface of the carton body.

As the carton cover is folded into the position illustrated in Figs. 8 and 9, means become effective that engage its outwardly projecting end flaps 35a and 35b and fold them inwardly over the end walls 23a and 23b of the carton body so that upon further closing of the carton cover the outer edges of the tabs 36a and 36b of said flaps come against the beveled surfaces 91a and 92a of the lugs 91, 92 which guide them into the open incisions 37a and 37b. For this purpose two turning bars or planks 101 and 102 are arranged at either side of the conveyor 40 above and in vertical alignment with the inner surfaces of the previously described guide rods 63 and 64 (Figures 4 and 5). Said planks are held in position by two rods 101' and 102', respectively, that are adjustably supported from the hereinbefore described vertical posts 66 at either side of the conveyor 40. The front ends of said bars are located a short distance beyond the cover turning rods 97 and 98 in the direction of movement of the conveyor 40 and are turned outwardly along a smooth gradual curve somewhat in the manner of the tips of skis as shown at 101a and 102a in Figs. 7, 8, and 9. As a carton with its cover in upright or backwardly inclined position moves into the space between said bars 101 and 102, the forward ends of said bars engage the ends flaps of its cover and fold them smoothly in inward direction as illustrated in Fig. 8 until they lie flat against the end walls of the carton body as shown in Fig. 9.

Reverting to Fig. 7, when the incisions 37a and 37b in the end walls 23a and 23b of the carton body are opened for the reception of the tabs 36 in the manner hereinbefore described, there is a tendency for the corner flaps 26 and 29 of the rear and front walls of the carton body to separate from the end walls in response to the pressure exerted upon the center of said end walls by the beveled lugs 91, 92. This is liable to interfere with the proper folding of the cover since the inwardly bent end flaps of the carton cover might enter into the space between the end walls 23 and the corner flaps 26 and 29, respectively, instead of sliding along the outer surfaces of said corner flaps. Means are therefore provided in accordance with the invention that press the corner flaps 26 and 29 inwardly during the cover folding operation so as to keep them out of the way of the descending cover flaps. For this purpose elongated bar-shaped strips 103 and 104 are mounted on the first pair of the hereinbefore described posts 66 above the clamps 65 (Figures 3, 4, 5, and 6). Said strips are arranged to converge slightly toward the carton conveying channel as determined by the guide rods 63 and 64, with their front ends supported from adjacent posts 66 by suitable stems 103a and 104a. Said front ends are bent to form parallel tongs 103b, 104b which are situated in the same sector, longitudinally of the conveyor 40, as the curved tips 101a and 102a of the turning planks or bars 101 and 102 and extend in vertical alignment with the inner surfaces of the guide rods 63 and 64. Thus, as the carton advances to a point where the bars or planks 101 and 102 engage the end flaps of its cover and fold them down upon the end walls of the carton body, the tongs 103b and 104b laterally engage the corner flaps first of the rear wall (Fig. 8) and afterwards of the front wall (Fig. 9) of the carton body and maintain them dependably out of the path of the descending cover flaps.

Soon after the advancing carton has come within the reach of, and is acted upon by, the end flap folding planks 101 and 102, it also comes within the reach of means that bear down upon its forwardly inclined cover and close it fully down upon the carton body; and as the cover is closed by said means, the bottom edges of its tabs 36 strike against, and glide downwardly, the inwardly inclined upper surfaces 91a and 92a of the beveled lugs 91 and 92 which guide them into the incisions 37, in the end walls of the carton body, which at this moment are held open by the inner edges 91b and 92b of said lugs as illustrated in Fig. 11. Said means for fully closing the carton cover comprises two endless sprocket chains 105 and 106 disposed in transversely spaced vertical planes above the conveyor 40, with their lower runs 105a and 106a extending substantially parallel to the upper runs 41a and 42a of the conveyor chains from a point approximately halfway between the ends of the horizontally positioned chains 71 and 72 to a point substantially in alignment with the rear end of said conveyor chains (Figs. 3, 5 and 6). At their front end said chains 105 and 106 are trained around a pair of sprockets 107 and 108 (Fig. 5) that are loosely mounted upon a transverse shaft 109 which is suitably held in the side panels 46a and 47a of the machine frame. At their rear ends said sprocket chains 105 and 106 are trained about a pair of sprockets 110 and 111 (Fig. 19) that are preferably of a somewhat smaller diameter than the front end sprockets 107, 108 and which are keyed upon a transverse shaft 112 that is suitably journaled in the side panels of the machine frame at a somewhat lower level than the shaft 109, as best shown in Fig. 6. Two idler sprockets 114 and 115 (Figs. 5 and 19) suitably supported from the adjustable side panels 46a and 47a of the machine frame are arranged to engage the lower runs of the sprocket chains 105 and 106 at a point limited distance inwardly from their front ends such that the surface determined by the initial portions of said runs 105a, 106a descends obliquely toward the surface determined by the upper runs 41a and 42a of the conveyor chains, while the remaining portions of said runs 105a, 106a define a surface that extends precisely parallel to the conveyor at a distance substantially equal to the depth of the cartons that there are to be processed by the machine of the invention. Supported by and extending across the described sprocket chains 105 and 106 are four sets of each four transverse bars 117 the outer surfaces of which are preferably of arcuate contour as shown at 118.

The sprocket chains 105 and 106 are driven in the opposite direction to the conveyor chains 41 and 42 such that the adjacent runs of all said chains advance at equal speed and in the same direction; and the operation of the chains 105 and 106 relative to the conveyor chains 41 and 42 is so timed that as a pair of impeller lugs 61 and 62 approaches the front end of the chains 105 and 106 and moves a carton, with its cover in rearwardly inclined position, underneath the obliquely descending initial portion of the lower runs 105a and 106a of said chains, a set of bars 117 swings down around the front end of the sprockets 107 and 108 and engages the outer face of the backwardly inclined carton cover depressing it progressively onto the carton body as illustrated in Fig. 10; and by the time the impeller lugs 61 and 62 have advanced the carton to and beyond the idler sprockets 114 and 115 into the parallel portion of the channel defined by the upper runs 41a, 42a of the conveyor chains and the lower runs 105a, 106a of the chains 105 and 106, the last of the depressor bars 117 in the particular set bears fully upon the carton cover and the whole set of depressor bars advances in unison with the carton, positively maintaining its cover in closed position for the remaining portion of its travel through the machine of the invention.

Means are provided in accordance with the invention which fold the front flap 34 of the carton cover 21 over the front wall 25 of the carton body 20 and tuck the tab 38 of said front flap into the incision 39 in said front wall as the depressor bars 117 close the carton cover upon the carton body in the described manner. For this purpose another pair of endless sprocket chains 121 and 122 is disposed within transversely spaced vertical planes above the conveyor 40 and intermediately of the chains 105 and 106 and is arranged to move in the same direction as said chains 105, 106 (Figs. 3, 5 and 6). Said chains 121 and 122 are materially shorter in length than the chains 105, 106 and, at their front ends, they are trained around idler sprockets 123 and 124 (Figs. 14 and 18) of substantially the same size as the idler sprockets 107 and 108 which support the front ends of the depressor bar chains 105, 106; and like said sprockets 107, 108 the sprockets 123, 124 are loosely supported upon the transverse shaft 109. The rear ends of the chains 121, 122 are trained around sprockets 125 and 126 which are of a smaller diameter than the sprockets 123, 124 and are keyed upon a drive shaft 127 that is journaled in the adjustable side panels 46a, 47a of the machine frame 48 (Fig. 19). At diametrically opposite points of their circumference said chains 121, 122 carry two transverse spindles 128, and rotatably supported upon each of said spindles is an arched lever 130 (Figures 6 and 12). Pivotally supported within the forked inner end 131 of said arched lever 130 is a cam follower roller 132, while the outer end 133 of said lever carries a transverse plate or shelf 134 that has a spade-like projection 135 at its upper edge. Said projection is slightly forwardly inclined relative to the plane of the shelf 134 (Fig. 6) and the free edge of said projection is beveled, as shown at 136 in Fig. 12. Spring means 137 coiled around and anchored in the spindle 128 is arranged to normally maintain the lever 130 in an extreme clockwise position relative to said spindle 128 (as viewed in Figs. 6 and 12) which is reached when a stop lug 138 projecting from said spindle 128 strikes against a shoulder 139 formed in the adjacent side wall of the arched lever 130. In Fig. 6 the upper one of the arched levers 130 supported from the sprocket chains 121, 122 is shown in said extreme clockwise position, wherein its shelf 134 is situated above and approximately parallel to the surface determined by said sprocket chains.

In practical performance the chains 121, 122 are operated at the same speed as the chains 105, 106 which carry the depressor bars, and in such a timed relation relative thereto that a lever 130 will follow closely behind each set of depressor bars 117 as it swings around the front sprockets 107, 108 and moves into contact with the cover of a carton underneath. For this purpose both, the depressor bar chains 105, 106 and the chains 121, 122 are driven from a common source of rotary power. Having reference to Figs. 4 and 19 the aforementioned drive shaft 53 upon which are mounted the sprockets 51 and 52 at the rear end of the conveyor 40, carries at one of its ends a gear 140 that meshes with another gear 141. Said last mentioned gear 141 is keyed to a stub shaft 142 that is rotatably supported from the side wall 47 of the machine frame 48. Likewise keyed to said stub shaft 142 is a sprocket 143 which is operatively connected with a sprocket 144 by means of a sprocket chain 145 that is trained around said sprockets 143 and 144 and an adjustable idler sprocket 146 which is suitably supported from the side panel 47a of the machine frame. The sprocket 144 is keyed to one end of the aforementioned shaft 127 which is the shaft that carries the sprockets 125 and 126 at the rear end of the sprockets chains 121 and 122 which support the arched levers 130. Keyed to the other end of said transverse shaft 127 is another sprocket 147 which is operatively connected with a sprocket 148 firmly mounted upon the previously mentioned transverse shaft 112 by means of sprocket chain 149 that is trained around both said sprockets 147 and 148 and an adjustable idler sprocket 150 which is suitably supported from the adjustable side panel 46a of the machine frame. Said shaft 112 is the shaft that drives the sprockets 110, 111 which operate the depressor bar chains 105 and 106.

Whenever a set of depressor bars swings down about the front sprockets 107, 108 of its supporting chains 105, 106 and engages the rearwardly inclined cover of a carton, an arched arm 130 trailing closely behind said set of depressor bars engages with its shelf 134 the rearwardly projecting front flap 38 of the carton cover, whereupon said lever is arranged to tilt forwardly so as to bend said front flap downwardly relative to the plane of the descending carton cover. Having reference to Figures 6, 10, 13 and 14, a cam 156 is mounted firmly upon the stationary transverse shaft 109 and its contour exhibits a steep rise 156a that is engaged by the roller 132 of each arched lever 130 as it approaches the front end of its orbit as determined by the sprocket chains 121, 122. When the roller 132 of a lever 130 engages the rise 156a of the stationary cam 156, the lever 130 is turned in counter-clockwise direction about the spindle 128, which places the shelf 134 into the position illustrated in Figure 10 wherein its plane extends radially from the curved surface defined by the front ends of the sprocket chains 105, 106 and 121, 122 that carry the depressor bars 117 and the arched levers 130, respectively. It is in this position that the shelf 134 engages the tab 38 of the front flap of the carton cover, as said cover is in the process of being folded upon the carton body by the set of depressor bars that travels in advance of the arched lever 130, as illustrated in Fig. 10. Just as the shelf 134 contacts the tab 38 in the described manner, the cam follower roller 132 encounters another sudden rise 156b in the contour of the stationary control cam 156, which swings the shelf 134 and its spade 135 rapidly in forward direction moving them from the position shown in Fig. 10 into the position illustrated in Fig. 13. As a result of said movement of shelf 134 the front flap 34 of the descending carton cover is swiftly folded into a position substantially at right angles to the top panel of the cover, with the tab 38 of said flap sliding downwardly along the inner surface of the shelf into contact with the forwardly tilted spade 135 thereof. Due to its forwardly tilted position relative to the surface of the shelf 134, said spade 135 now presses the tab 38 against the front wall 25 of the carton body above the horizontal leg 39a of the incision 39 which causes said incision to open so that it is adapted to receive both the spade 135 and the tab 38 held within said spade. As the arched lever 130 advances further along its orbit and its roller 132 negotiates the second rise 156b of the cam 156 and drops into an adjoining horizontal segment 156c of said cam, the spring 137 is effective to turn the lever 130 slightly backwards on its spindle 128 (i. e. in clockwise direction as viewed in Figs. 13 and 14) so that the shelf 134 resumes its radially projecting position relative to the surface determined by the supporting chains 121, 122. The described clockwise rotation of the arched lever 130 coupled with the advance of said lever along its predetermined orbit from the curved front end portions to the horizontal bottom runs of the chains 121, 122 causes the shelf 134 to assume a vertical position and to drop relative to the carton body from the level illustrated in Fig. 13 to the level illustrated in Fig. 14. As a result thereof the beveled edge 136 of the spade 135 slides through the incision 39 and the spade enters into the interior of the carton body between the front wall thereof and the product contained therein, taking along the tab 38 of the front flap 34 as the last of the depressor bars 117 of the particular set in action at the moment bears down upon the front edge of the carton cover and completes the closing operation thereof. However, as soon as the trailing end of the closed carton moves past and beyond the rear end of the chains 121, 122, where said chains commence to move upwardly away from the carton conveyor 40, the spade 135 is withdrawn from the front wall of the carton. By that time the cam follower roller 132 at the rear end of the arched lever 130 has lost contact with the stationary cam 156 so that the rotary position of said lever is no longer positively controlled and said lever may readily adjust itself to a position that is most convenient for a smooth withdrawal of the spade 135 from the incision in the front wall of the carton body; and since the depressor bars 117 bear fully upon the carton cover at the time the spade is withdrawn, there is no danger that the tab 38 may follow the spade 135 and be accidentally disengaged from the inside of the carton body.

When the closed carton emerges from underneath the depressor bars 117 at the rear end of the described machine, however, the resiliency of the material from which the carton cover is made, and/or expansional forces set up by the elasticity of the product contained in the closed carton, may result in withdrawal of the tab 38 from the incision 39 and open the carton cover. To prevent mis-operations of this kind a stamp 160 is forced against the front wall of the carton body to deform said front wall and the tab inside the carton body in a manner effective to disalign the edges of the tab from the edges of the incision. Thus, the tab is dependably anchored within the carton body. Having particular reference to Figs. 15 and 16, the tab locking stamps comprised in the machine of the invention have the shape of a T with their stems 161 bolted to an endless sprocket chain 162 which extends intermediately of the conveyor chains 41 and 42, with its upper horizontal run 162a disposed at the same level and running in the same direction as the upper horizontal runs 41a and 41b of said conveyor chains (Figs. 3, 4 and 5). The front end of said endless conveyor chain 162 (Figs. 3 and 18) is trained around a sprocket 163 that is firmly mounted upon a sleeve 164 which turns on one of the hereinbefore described transverse rods 68 that is located at a point longitudinally of the machine, somewhat in front of the transverse shaft 109 which carries the sprockets for the depressor bar chains. At its rear end said chain 162 is trained about a sprocket 165 that is loosely supported upon the hereinbefore described drive shaft 53 of the conveyor 40, and a third sprocket 166 disposed a distance below the sprocket 165 and mounted upon a transverse shaft 167 that is suitably supported from the side walls of the machine frame. As may be seen from Fig. 3 the sprocket chain 162 carries four such T-shaped stamps 160 with their transverse bars 168 in leading position, and for proper operation the movement of said sprocket chain must be so timed relative to the conveyor 40 that the stamps 160 trail behind the cartons propelled by the lugs 61, 62 while the covers are being closed and the tabs 38 are being tucked into the incisions 39, but after the spades 135 have been removed from said incisions, catch up with the cartons before the cartons reach the end of the processing channel formed by the machine of the invention. For this purpose a sprocket 170 is firmly secured to the sleeve 164 at the front end of the chain 162 and said sprocket is operatively connected by a sprocket chain 171 with another sprocket 172 of somewhat smaller diameter that is keyed to the previously described transverse shaft 85 in the power train of the horizontally disposed sprocket chains 71 and 72.

As best shown in Figure 16 the transverse bars 168 of the tab locking stamps 160 are preferably arranged in a forwardly tilted position and are of a depth to engage the front wall of the carton below its incision 39; and to prevent that said tab locking stamps 160 might merely push the cartons ahead of the conveyor 40, when they catch up with them, instead of indenting their front walls, the leading bar in each set of depressor bars 117 is provided with a suitable lip 174 that engages behind each carton and prevents it from moving ahead of the conveyor 40. Further, to make sure that the forwardly inclined transverse bars 168 of the stamps 160 engage the front walls of the closed cartons at the proper level, the horizontal run of the endless chain 162 may be positively supported by a guide plate 179 (Figs. 3, 6 and 17). Thus, the tab locking stamps 160 are effective to indent the front walls of the closed cartons in a manner that anchors the tabs 38 within the incisions 39 as illustrated in Figs. 15 and 16, and hence the cartons emerging from underneath the depressor bars 117 at the discharge end of the carton closing machine remain in properly closed condition after the pressure exerted upon their covers by said depressor bars has been released.

In practical operation the cartons, after they have been filled at a preceding processing station (not shown), are successively delivered with their rear walls in leading position onto the upper run of the conveyor 40 which engages them with its lugs 61, 62 and advances them to the right as viewed in Fig. 1, with the guide rods 63, 64 maintaining them in properly centered position. As a carton, thus advanced, moves into the space between the horizontally positioned sprocket chains 71 and 72, two lugs 91, 92 carried by said chains engage its end walls and press them inwardly above the horizontal legs of their incisions 37 such that said incisions are opened as illustrated in Figs. 7 and 8. At about the same time the transverse rods 97, 98 engage its cover at its outer surface, especially if said cover is folded forwardly away from the carton body over an angle of more than 90°, and swing it into a backwardly inclined position as shown in Fig. 8. In this position the smoothly curved front ends 101a and 102a of the end flap folding planks 101 and 102 engage the outwardly projecting end flaps 35a and 35b of the carton cover and fold them inwardly while the tongs 103b and 104b at the ends of the converging strips 103 and 104 engage the corner flaps 26 and 29 of its rear and front wall, respectively, and hold said flaps safely out of the way of the descending end flaps, as shown in Figs. 8 and 9. As the carton advances further, it moves under the obliquely descending front portion of the bottom run 105a, 106a of the sprocket chains 105, 106 and a set of depressor bars 117 carried by said chains bears gradually down upon its cover and closes it progressively upon the carton body, while the tabs 36a and 36b of its end flaps 35a and 35b are guided by the inwardly declined upper surfaces of the beveled lugs 91, 92 into the end wall incisions 37a and 37b respectively which at the moment are held open by the inner edges of said lugs as illustrated in Figs. 10 and 11. Then, when the beveled lugs 91, 92 move laterally away from the ends of the carton at the rear end of the horizontally positioned sprocket chains 71, 72, the center areas of said carton ends return to their original position so that the tabs 36a and 36b of the carton cover are securely held within the carton body between the inner surfaces of the end walls thereof and the product contained therein. As the depressor bars 117 bear down upon and close the cover of a carton, the shelf 134 of an arched tucking lever 130 engages the tab 38 of the cover front flap as shown in Fig. 10 and folds the front flap inwardly, pressing eventually its spade 135 with the tab 38 underneath against the front wall of the carton body above the incision 39 so as to open said incision as illustrated in Fig. 13. Thereupon the spade 135 is moved downwardly into the incision 39 and slides the tab 38 through said incision into the interior of the carton as the depressor bars 117 complete their task and close the cover fully upon the carton body (Fig. 14). The tab of the front flap of the carton cover is now fully inserted through the incision 39 and remains in this position as the spade 135 is withdrawn from said incision when the lever 130 moves upwardly away from the carton at the rear end of the sprocket chains 121, 122; and before a carton closed in the described manner moves out from underneath the depressor bars 117, a tab-locking stamp 160 catches up with its front wall and bends it inwardly as shown in Fig. 16. This also bends the end of the tab 38 inside the filled carton and dislocates its edges relative to the incision 39. Thence, when the depressor bars release the carton cover at the rear end of the machine, the tab 38 is unable to slip out of the incision 39, and the carton therefore remains closed irrespective of the resiliency of the cardboard material from which the cover is made and/or expansional forces that may be set up by the resiliency of the product contained in the carton. Thus, the described machine is capable of fully and lastingly closing cartons, of the type described, without requiring any manual labor whatsoever, and without subjecting them to undue strains, and also with no changes in the speed of conveyance. Thence there is no danger that the cartons might be damaged or their contents be spilled. Moreover, the construction of the described machine is such that it may readily be adjusted to handle cartons of different size. Thus, to handle cartons of different depth it is merely necessary to appropriately vary the vertical position of the adjustable side panels 46a and 47a relative to the upper runs of the carton conveyor 40; and to process cartons of different width, longitudinally of the machine, requires no more than to adjust the operational relation of the depressor bar chains 105 and 106 and the chains 121, 122 which carry the arched arms 130 and, similarly, to adapt the machine for use with cartons of different width transversely of the machine, it is only necessary to adjust the mounting of the horizontal conveyor chains 71 and 72 and the transverse position of the posts 66, from which are supported the guide rods 63, 64, the retaining tongs 103 and 104 and the turning planks 101 and 102.

While we have explained our invention with the aid of a particular embodiment thereof it will be understood that we do not wish to be limited to the specific constructional details shown and described which may be departed from without departing from the scope and spirit of the invention.

We claim:

1. A machine for closing cartons of the type comprised of a carton body having a rear wall and an end wall provided with an incision, and a carton cover hingedly connected to said rear wall and having an end flap provided with a tab, which machine comprises conveying means arranged to advance the carton along a predetermined path with its end wall parallel to said path, first means adapted to move in timed relationship with said conveying means over a portion of said predetermined path and to project inwardly and engage the end wall of the carton body so as to open the incision therein, second means effective to bend the end flap of the carton cover into parallel relation with the end wall of the carton body, and third means effective during the effective phase of said first means to fold the carton cover upon said carton body in a manner introducing the tab of the end flap into the open incision in the end wall of the carton body.

2. A carton closing machine for closing cartons of the type comprised of a carton body having a rear wall and an end wall provided with an incision, and a carton cover hingedly connected to said rear wall and having an end flap provided with a tab adapted to enter into the incision in the end wall of the carton body, which machine comprises conveying means arranged to advance the carton along a predetermined path with its end wall parallel to said path, first means adapted to move synchronously with said conveying means over a portion of said predetermined path and to project inwardly and apply lateral pressure to the end wall of the carton in a manner adapted to open its incision and second means effective during the effective phase of said first means to bend the end flap relative to the carton cover and fold the carton cover upon said carton body in a manner introducing the tab of the end flap into the open incision in the end wall of the carton body.

3. A machine for closing cartons of the type comprised of a carton body having a rear wall and two end walls provided with incisions, and a carton cover hingedly connected to the rear wall of the carton body and having two end flaps provided with locking tabs, which machine comprises conveying means arranged to advance a carton along a predetermined path with its end walls parallel to said path, first means adapted to move parallel and synchronously with said conveying means over a portion of said predetermined path and to project inwardly and apply pressure against the end walls of the carton body so as to open the incisions thereof, second means effective as said carton advances along said predetermined path to bend the end flaps at the carton cover inwardly, and third means effective during the effective phase of said first means to fold the cover downwardly upon the carton body in manner introducing the tabs of the end flaps into the opened incisions in the end walls of the carton body.

4. A machine for closing cartons of the type comprised of a carton body having a rear wall and two end walls provided with incisions and a carton cover hingedly connected to the rear wall of the carton body and having two end flaps each provided with a locking tab, which machine comprises conveying means arranged to advance a carton along a predetermined path with its end walls parallel to said path and its rear wall in leading position, means adapted to move parallel with and at substantially the same speed as said conveying means over a portion of said predetermined path and to project inwardly and apply lateral pressure against the end walls of the carton body above the incisions provided in said end walls so as to open said incisions, means effective as said carton advances along said predetermined path to engage the end flaps to the carton cover and bend them inwardly, and means effective during operation of said incision-opening means to engage the cover and fold it downwardly upon the carton body in a manner introducing the tabs of the end flaps into the open incisions in the end walls of the carton body.

5. A machine for closing cartons of the type comprised of a carton body having a bottom panel, a front wall, a rear wall and two end walls provided with incisions, and a carton cover having a top panel hingedly connected to said rear wall and two end flaps hingedly connected to said top panel at the opposite ends thereof and provided with tabs adapted to fit into the incisions in the end walls of the carton body, which machine comprises conveying means arranged to advance a carton along a predetermined path with its rear wall in leading position, means accompanying the carton as it advances on said conveying means over a portion of said predetermined path at either side thereof and arranged to apply inwardly directed pressure against the end walls of the carton body above said incisions so as to open said incisions; means effective as said carton advances along said predetermined path to engage the end flaps of the carton cover and bend them relative to the plane of the top panel toward and into parallel relation with the corresponding end walls of the carton body, and means effective during operation of said incision-opening means to engage the top panel and fold it downwardly upon the carton body into a position parallel to the bottom panel thereof.

6. A machine for closing a carton of the type comprised of a body portion having a bottom panel, a front wall, a rear wall and two end walls provided with incisions, and a cover portion having a top panel hingedly connected to said rear wall and end flaps hingedly connected to said top panel and provided with tabs of a size adapted to fit into said incisions, which machine comprises conveying means arranged to advance a carton along a predetermined path with its rear wall in leading position; means including beveled lugs arranged at either side of said conveying means and operable in timed relation therewith to open the incisions in the end walls of the carton during part of its travel along said predetermined path; camming means arranged at either side of said conveying means and adapted to engage the end flaps of the carton cover, as the carton advances on said conveying means, and fold them inwardly into parallel relationship with the end walls of the carton body; and means operative when said incision-opening means acts upon the carton and as said camming means folds the end flaps of the carton cover inwardly, to fold the top panel of the carton cover upon the carton body into parallel relation to the bottom panel thereof in a manner inserting the tabs of said end flaps into the opened incisions in said end walls.

7. A machine according to claim 6 wherein said lugs are of wedge shape having declined upper surfaces adapted to guide the tabs of a carton cover end flaps into the incisions in the side walls of the carton body engaged by their edges.

8. A machine for closing a carton of the type comprised of a body portion having a bottom panel, a front wall, a rear wall and two end walls provided with incisions, and a cover portion having a top panel hingedly connected to said rear wall and end flaps hingedly connected to said top panel and provided with tabs of a size adapted to fit into said incisions, which machine comprises in combination conveying means arranged to advance a carton along a predetermined path with its end walls parallel to said path and its rear wall in leading position; guide means arranged at either side of said conveying means to maintain the carton traveling thereon in properly centered position; means including beveled lugs arranged at either side of said conveying means and operable in timed relation therewith to urge a pair of said lugs against the end walls of the carton during part of its travel along said predetermined path; a stationary element disposed above said conveying means at an initial point thereof at an altitude greater than the depth of the carton so as to engage its cover and fold it into a backwardly inclined position as the carton advances along said predetermined path; camming means arranged at either side of said conveying means above and in vertical alignment with said guide means and adapted to engage the end flaps of the cover of a carton advancing on said conveying means and fold them inwardly into parallel relationship with the end walls of the carton body; retaining tongs arranged to engage the end walls of a carton engaged by said incision-opening means to maintain the upper portions thereof within vertical planes out of the way of the cover end flaps; and means operative when said incision-opening means and said retaining means act upon the carton, to fold the carton cover upon the carton body with its top panel into a parallel relation to the bottom panel of the carton body in a manner adapted to insert the tabs of the inwardly folded end flaps of the carton cover into the open incisions in the end walls of the carton body.

9. Machine according to claim 8 wherein said stationary element is a horizontal rod extending transversely across said conveying means.

10. A machine for closing cartons of the type comprised of a body portion having a rear wall and a front wall provided with an incision and a carton cover hingedly connected to said rear wall and having a front flap provided with a locking tab, which machine comprises conveying means arranged to advance the carton with its rear wall in leading position along a predetermined path; means adapted to fold the open carton cover progressively upon the carton body and thereafter maintain said cover in closed position upon said carton body for a portion of said predetermined path; means operative to bend the front flap of the carton cover relative to said cover, as said cover is folded upon the carton body, and exert pressure upon the front wall of the carton body above the incision thereof prior to completion of the cover folding operation so as to open said incision for the tab to enter as said folding means completes the cover folding operation; and means operative upon entrance of said tab through said incision to anchor said tab within the carton body while said cover folding means is still effective to maintain the cover in closed position upon the carton body.

11. A machine for closing cartons of the type comprised of a body portion having a rear wall and a front wall provided with an incision and a carton cover hingedly connected to said rear wall and having a front flap provided with a locking tab, which machine comprises conveying means arranged to advance the carton with its rear wall in leading position along a predetermined path; means adapted to fold the open carton cover progressively upon the carton body and thereafter maintain said cover in closed position upon said carton body for a portion of said predetermined path, disposed above said conveying means; means trailing the carton as it advances along said predetermined path and operative to bend the front flap of the carton cover relative to said cover, as said cover is folded upon the carton body, and exert pressure upon the front wall of the carton body above the incision prior to completion of the cover folding operation so as to open said incision for the tab to enter as said folding means completes the cover folding operation; and means likewise trailing the carton and operative, upon entrance of said tab through said incision, to anchor said tab within the carton body while said cover folding means is still effective to maintain the cover in closed position upon the carton body.

12. A machine for closing cartons of the type comprised of a body portion having a bottom panel, a rear wall and a front wall provided with an incision, and a cover portion having a top panel and a front flap provided with a tab of a size adapted to fit into said incision, which machine comprises conveying means arranged to advance the carton with its rear wall in leading position along a predetermined path; means adapted to engage the open cover of the carton and fold it progressively upon the carton body, disposed above said conveying means; and means operative to bend the front flap of the carton cover downwardly relative to the top panel thereof, as said cover is folded upon the carton body, and press its tab against the front wall of the carton body above the incision while the cover is still partly open thereby opening said incision, said last mentioned means having a spade-like projection adapted to engage the cover tab and jointly therewith slide through the open incision into the interior of the carton body, as said carton folding means completes the folding operation and moves the top panel of the carton cover into a position parallel to the bottom panel of the carton body.

13. A machine for closing cartons of the type comprised of a body portion having a bottom panel, a rear wall and a front wall provided with an incision, and a cover portion having a top panel and a front flap provided with a tab of a size adapted to fit into said incision, which machine comprises in combination conveying means arranged to advance the carton with its rear wall in leading position along a predetermined path; means adapted to engage the open carton cover and fold it progressively upon the carton body disposed above said conveying means, said folding means being arranged to thereafter hold the carton cover in closed position upon the carton body for a portion of said predetermined path; and means operative to bend the front flap of the carton cover downwardly relative to the top panel thereof, as said cover is folded upon the carton body, and press its tab against the front wall of the carton body above the incision while the cover is still partly open thereby opening said incision, said last mentioned means having a spade-like projection adapted to engage the cover tab and jointly therewith slide through the opened incision into the interior of the carton body as said cover folding means completes the folding operation, and to withdraw from said incision, while said folding means is still effective to hold the cover in closed position, so as to prevent withdrawal of the tab from the incision.

14. A machine for closing cartons of the type comprised of a body portion having a bottom panel, a rear wall and a front wall provided with an incision, and a cover portion having a top panel and a front flap provided with a tab of a size adapted to fit into said incision, which machine comprises in combination conveying means arranged to advance the carton with its rear wall in leading position along a predetermined path; means adapted to engage the open carton cover and fold it progressively upon the carton body disposed above said conveying means, said folding means being arranged to thereafter hold the carton cover in closed position upon the carton body for a portion of said predetermined path; means operative to bend the front flap of the carton cover downwardly relative to the top panel thereof as said cover is folded upon the carton body and press its tab against the front wall of the carton body above the incision thereof while the cover is still partly open thereby opening said incision, said last mentioned means including a projection arranged to slide through the opened incision as said cover folding means completes the folding operation to effect entrance of the cover tab through said opened incision into the interior of the carton body, and to withdraw from said incision, while said folding means is still effective to hold the cover in closed position; and means operative upon withdrawal of said tab-inserting means and while said folding means is still effective to hold the cover in closed position, to deform the front wall of the carton body so as to anchor said tab within the carton body.

15. A machine for closing cartons of the type comprised of a body portion having a bottom panel, a rear wall and a front wall provided with an incision, and a cover portion having a top panel and a front flap provided with a tab of a size adapted to fit into said incision, which machine comprises in combination conveying means arranged to advance the carton with its rear wall in leading position along a predetermined path, means adapted to engage the open carton cover and fold it progressively upon the carton body disposed above said conveying means, said folding means being arranged to thereafter hold the carton cover in closed position upon the carton body for a portion of said predetermined path, means operative to bend the front flap of the carton cover downwardly relative to the top panel thereof as said cover is folded upon the carton body and open said incision while the cover is still partly open, said last mentioned means having a spade-like projection adapted to engage the cover tab and jointly therewith slide through the opened incision into the interior of the carton body as said cover folding means completes the folding operation and moves the top panel of the carton cover into a position parallel to the bottom panel of the carton body, and to withdraw from said incision, while said cover folding means is still effective to hold the cover in closed position so as to prevent withdrawal of the tab from the incision.

16. A machine for closing cartons of the type comprised of a body portion having a bottom panel, a rear wall and a front wall provided with an incision, and a cover portion having a top panel and a front flap provided with a tab of a size adapted to fit into said incision, which machine comprises in combination conveying means arranged to advance the carton with its rear wall in leading position along a predetermined path; means adapted to engage the open carton cover and fold it progressively upon the carton body, disposed above said conveying means; means operative to bend the front flap of the carton cover downwardly relative to the top panel thereof as said cover is folded upon the carton body and effect entrance of the cover tab through the incision in the front wall of said carton body as said carton folding means completes the folding operation; and means operative, while said cover folding means is effective to hold the cover in closed position, to deform the front wall of the carton body so as to lock said tab within the carton body.

17. A machine for closing cartons of the type comprised of a body portion having a front wall and a rear wall and a cover hingedly connected to said rear wall, comprising conveying means extending along a predetermined path and having a member adapted to engage the front wall of a carton of the type defined and advance it with its rear wall in leading position along said predetermined path, a pair of endless belts disposed in transversely spaced vertical planes above said conveying means with their lower runs extending parallel thereto at a distance substantially equal to the depth of the cartons to be processed by the machine, a plurality of adjacently positioned transverse bars supported from said belts, and means operating said belts in timed relation with said conveying means such that their lower runs move in the same direction as said conveying means with the last of said transverse bars substantially in vertical alignment with said member.

18. A machine according to claim 17 wherein the outer surfaces of said transverse bars are of convex contour.

19. A machine for closing cartons of the type comprised of a carton body having a rear wall and a pair of end walls provided with incisions, and a cover hingedly connected to said end wall and having a pair of end flaps provided with locking tabs adapted to fit into said incisions, which machine comprises conveying means arranged to advance a carton along a predetermined substantially horizontal path, first endless belts disposed at either side of said conveying means with their inner runs extending within a horizontal plane parallel to said conveying means, outwardly projecting lugs supported from said first belts, means operable to move said first belt so that their inner runs travel in the same direction as said conveying means, camming bars located at either side of said conveying means and arranged to engage the open end flaps of the cover of a carton traveling on said conveying means and fold them inwardly, a second endless belt disposed above said conveying means with its lower run extending parallel thereto, a number of transverse bars supported from said second belt, and means operating said second belt in such a manner that its lower run moves in the same direction as said conveying means.

20. A machine for closing cartons of the type comprised of a carton body having a rear wall and a pair of end walls provided with incisions, and a cover hingedly connected to said end wall and having a pair of end flaps provided with locking tabs adapted to fit into said incisions, which machine comprises in combination conveying means arranged to advance a carton along a substantially horizontal predetermined path, first endless belts disposed in a horizontal plane at either side of said conveying means with their inner runs extending parallel to said conveying means, outwardly projecting lugs supported from said first belts at a level above the incisions in the end walls of a carton traveling on said conveying means, means operating said first belts in timed relation to said conveying means such that their inner runs move in the same direction as said conveying means with said lugs in transverse alignment with the incisions in the end walls of a carton traveling on said conveying means so that they may press against the end walls of said carton and open said incisions, camming bars located at either side of said conveying means and arranged to engage the open end flaps of the cover of a carton traveling on said conveying means and fold them inwardly, a second endless belt disposed above said conveying means with its lower run extending parallel to said conveying means at a distance substantially equal to the depth of the cartons to be processed by the machine from a point of said predetermined path a distance beyond the commencement of the inner runs of said first belts to a point beyond the end of the inner runs of said first belts, a plurality of adjacently positioned transverse bars of convex outer contour supported from said second belt, and means operating said second belt in timed relation to said conveying means in such a manner that its lower run moves in the same direction as said conveying means with said transverse bars in vertical alignment with a carton traveling on said conveying means.

21. A machine according to claim 20 wherein said lugs have outwardly declined upper surfaces adapted to guide the end tabs of the carton cover into the incisions in the end wall of the carton body.

22. A machine according to claim 20 comprising a rod extending at a point in front of the lower run of said second belt across said conveying means at an altitude higher than the body of the cartons to be processed by the machine.

23. A machine according to claim 20 comprising means adapted to contain the end walls of a carton traveling on said conveying means as the end flaps of its cover come against said camming bars and the transverse bars supported by said second belt bear down upon said cover.

24. Machine for closing cartons of the type composed of a carton body having a front wall provided with an incision and a rear wall, and a carton cover having a top panel hingedly connected to said rear wall and a front flap provided with a tab adapted to fit into said incision, which machine comprises conveying means arranged to convey a carton with its front wall in trailing position along a predetermined path, a first endless belt having a run extending parallel to said conveying means over part of said predetermined path, a number of transverse bars supported from said belt, means operating said first belt in timed relation with said conveying means such that said run moves in the same direction as said conveying means and said bars move into engagement with and depress the open cover of a carton traveling on said conveying means, another endless belt having a run extending adjacent to the parallel run of said first belt, a lever pivotally supported from said second belt and having an end projecting outwardly beyond the circumference thereof, means operating said second belt in the same direction and in timed relation with said first belt such that said lever trails directly behind said bars as said bars engage the cover of a carton traveling on said conveying means, and means operable to swing the projecting end of said lever forwardly about its pivot to cause it to fold the front flap of the carton cover relative to the top panel thereof as said cover is folded upon the carton body by said bars.

25. Machine for closing cartons of the type composed of a carton body having a front wall provided with an incision and a rear wall, and a carton cover having a top panel hingedly connected to said rear wall and a front flap provided with a tab adapted to fit into said incision, which machine comprises conveying means arranged to convey a carton with its rear wall in leading position along a predetermined path, a first endless belt having a run extending parallel to said conveying means over part of said predetermined path, a plurality of transverse bars supported from said belt, means operating said first belt in timed relation with said conveying means such that said run moves in the same direction as said conveying means and said bars move into engagement with and depress the open cover of a carton traveling on said conveying means, another endless belt having a run extending adjacent to the parallel run of said first belt, a lever pivotally supported from said second belt and having an end projecting outwardly beyond the circumference thereof, means operating said second belt in the same direction and in timed relation with said first belt such that said lever trails directly behind said bars as said bars engage the open cover of a carton traveling on said conveying means and means operable first to swing the said lever in a direction causing its projecting end to fold the front flap of the carton cover relative to the top panel thereof and press the tab of said flap against the front wall of the carton body above the incision therein so as to open said incision, and thereafter cause said projecting end to move downwardly relative to the front wall of the carton and effect entrance of said tab into said incision as said bars complete the folding of said cover.

26. Machine according to claim 25 wherein the projecting end of said lever possesses a transverse shelf provided with a forwardly inclined center projection adapted to enter into the incision in the front wall of the carton body.

27. Arrangement according to claim 25 wherein the defined run of said second belt is of shorter length than the parallel run of said first belt.

28. Machine for closing cartons of the type comprised of a body portion having a front wall provided with an incision and a rear wall, and a cover having a top panel hingedly connected to said rear wall and a front flap provided with a locking tab adapted to fit into said incision, which machine comprises means operable to fold an open cover upon the carton body and hold it temporarily in folded position; means operable coincident with said cover folding means to fold the flap of the cover inwardly relative to the top panel thereof during an initial phase in the operation of said cover-folding means, and to effect entrance of said tab into said incision during the final phase in the operation of said cover folding means; and means operable upon insertion of said tab into said incision, and while said carton folding means is still effective to hold the cover upon the carton body, to deform the front wall of the carton body so as to anchor the tab within said incision.

29. Machine for closing cartons of the type comprised of a body portion having a front wall provided with an incision and a rear wall, and a cover having a top panel hingedly connected to said rear wall and a front flap provided with a locking tab adapted to fit into said incision, which machine comprises means operable to fold an open cover upon the carton body and hold it temporarily in folded position; means comprising a transverse plate operable coincident with said cover folding means to fold the flap of the cover inwardly relative to the top panel thereof during an initial phase in the operation of said cover-folding means and to effect entrance of said tab into said incision during the final phase in the operation of said cover folding means; and means comprising another transverse plate operable upon insertion of said tab into said incision and while said carton folding means is still effective to hold the cover upon the carton body to deform the front wall of the carton body so as to anchor the tab within said incision.

30. Machine for closing cartons of the type composed of a body portion having a front wall provided with an incision and a rear wall, and a cover having a top panel hingedly connected to said rear wall and a front flap provided with a locking tab adapted to fit into said incision, which machine comprises means operable to fold an open cover upon the carton body and hold it temporarily in folded position; means including a first transverse plate having a center projection operable coincident with an initial phase in the operation of said cover folding means to fold the flap of the cover inwardly relative to the top panel thereof and press the tab of said flap against the front wall of the carton above said incision so as to open said incision, and operable coincident with the final phase in the operation of said cover folding means to insert its projection temporarily into said incision so as to effect entrance of the tab into said incision; and means including another transverse plate operable upon withdrawal of said projection from said incision, and while said cover folding means is still effective to hold the cover upon the carton body, to bend the front wall of the carton body and thus anchor the tab within said incision.

31. Arrangement according to claim 30 wherein said projection is inclined relative to said first plate in a direction toward the front wall of the carton body.

32. Arrangement according to claim 30 wherein said second plate is inclined relative to the front wall of the carton.

JOHN BOYCE.
DUDLEY W. HAYES.

References Cited in the file of this patent

UNITED STATES PATENTS

| Number | Name | Date |
|---|---|---|
| 2,241,942 | Berch | May 13, 1941 |
| 2,441,410 | Guyer et al. | May 11, 1948 |

FOREIGN PATENTS

| Number | Country | Date |
|---|---|---|
| 428,492 | Great Britain | May 14, 1935 |